United States Patent
Dinu et al.

(10) Patent No.: US 9,671,910 B2
(45) Date of Patent: Jun. 6, 2017

(54) MULTIPLE CONTROLLER COMMUNICATION METHOD FOR ACTIVE STYLUS DATA ACQUISITION

(71) Applicant: STMicroelectronics Asia Pacific Pte Ltd, Singapore (SG)

(72) Inventors: Leonard Dinu, Singapore (SG); Chao Chao Zhang, Singapore (SG); Dianbo Guo, Singapore (SG); Chee Weng Cheong, Singapore (SG); Eng Jye Ng, Singapore (SG)

(73) Assignee: STMicroelectronics Asia Pacific Pte Ltd, Singapore (SG)

( * ) Notice: Subject to any disclaimer, the term of this patent is extended or adjusted under 35 U.S.C. 154(b) by 175 days.

(21) Appl. No.: 14/522,098

(22) Filed: Oct. 23, 2014

(65) Prior Publication Data

US 2016/0117047 A1    Apr. 28, 2016

(51) Int. Cl.
*G06F 3/038* (2013.01)
*G06F 3/0354* (2013.01)
*G06F 3/041* (2006.01)
*G06F 3/044* (2006.01)

(52) U.S. Cl.
CPC .............. *G06F 3/044* (2013.01); *G06F 3/038* (2013.01); *G06F 3/03545* (2013.01); *G06F 3/0416* (2013.01); *G06F 2203/04104* (2013.01); *G06F 2203/04106* (2013.01)

(58) Field of Classification Search
CPC ... G06F 3/0412; G06F 3/0416; G06F 3/03545
See application file for complete search history.

(56) References Cited

U.S. PATENT DOCUMENTS

| | | | | |
|---|---|---|---|---|
| 7,292,229 B2 * | 11/2007 | Morag | ............... | G06F 3/03545 178/18.07 |
| 2010/0155153 A1 * | 6/2010 | Zachut | ............... | G06F 3/03545 178/18.03 |
| 2012/0056662 A1 * | 3/2012 | Wilson | ............... | G06F 3/0416 327/517 |
| 2013/0215049 A1 * | 8/2013 | Lee | ............... | G06F 3/0416 345/173 |
| 2015/0035797 A1 * | 2/2015 | Shahparnia | ............ | G06F 3/041 345/174 |

* cited by examiner

*Primary Examiner* — Nalini Mummalaneni
(74) *Attorney, Agent, or Firm* — Gardere Wynne Sewell LLP

(57) ABSTRACT

An electronic device may include a first controller associated with some channels of a digitizer having channels configured to receive a signal from a stylus, and with each channel having a direction. A second controller may be associated with channels of the digitizer not associated with the first controller. The first controller may scan for the signal at each channel associated with the first controller, and based on acquisition of the signal at a given channel associated with the first controller, calculate a property of the signal. The first controller may send the calculated property and the direction of the given channel to the second controller. The first controller and the second controller may scan for the signal at each channel having the direction of the given channel, at acquisition intervals based upon the calculated property.

14 Claims, 4 Drawing Sheets

MULTIPLE CONTROLLER COMMUNICATION METHOD FOR ACTIVE STYLUS DATA ACQUISITION

BACKGROUND

Portable electronic devices, such as smartphones and tablets are in wide usage in the world today. These portable electronic devices increasingly utilize touch screens to receive input from users, and are employed for many tasks that were previously performed using desktop computers. Due to the touch screen serving as the input device, as well as due to the increased functions for which such portable electronic devices are used, there is a market demand for such devices to have larger screens.

In addition to the market demand for large touch screens, there is also an increasing market demand for such large touch screens to be operable via a stylus. While a typical capacitive touch screen can be operated via a passive stylus without modification, data such as pressure, whether a switch on the stylus has been pressed, and data from an accelerometer or gyroscope in the active stylus, is unable to be sent. In addition, it may be difficult to differentiate a touch from a passive stylus and an user's hand, but such differentiation is achievable with a high degree of accuracy when an active stylus is used instead.

An active stylus contains circuitry that generates and transmits signals that can be picked up by a digitizer of the electronic device. These signals can be used to determine the location of the active stylus with respect to the screen (even if the active stylus is not in contact with the screen, and with a much greater degree of accuracy than a passive stylus), as well as the pressure with which the active stylus is being pressed against the touch screen.

An active stylus paired with a digitizer in electronic device is therefore able to provide the desired degree of accuracy, as well as additional functionality mentioned above such as pressure sensing. Thus, there is a demand for large touch screen electronic devices with active styluses.

The driving of such large touch screens capable of operation with such active styluses, however, presents challenges. Therefore, further advances are needed in this area.

SUMMARY

An electronic device may include a first controller associated with some channels of a digitizer having channels configured to receive a signal from a stylus, and with each channel having a direction. A second controller may be associated with channels of the digitizer not associated with the first controller. The first controller may scan for the signal at each channel associated with the first controller, and based on acquisition of the signal at a given channel associated with the first controller, calculate a property of the signal. The first controller may send the calculated property and the direction of the given channel to the second controller. The first controller and the second controller may scan for the signal at each channel having the direction of the given channel, at acquisition intervals based upon the calculated property.

Another aspect is directed to an electronic device that may include a stylus configure to transmit a signal, and a digitizer having channels, each channel being associated with one of a first direction and a second direction. A first controller may be associated with some channels of a digitizer in the first direction and some channels of the digitizer in the second direction. A second controller may be associated with channels of the digitizer not associated with the first controller. The first and second controller may be configured to synchronize with each other in the first direction based upon a property of the signal as received at a channel associated with the first direction, scan for the signal at each channel associated with the first direction, synchronize with each other in the second direction, and scan for the signal at each channel associated with the second direction.

A method aspect is directed to method of operating an electronic device. The method may include scanning for a signal from a stylus to each channel of a digitizer associated with a first controller, with each channel having a corresponding direction. A property of the signal may be calculated based on the signal as acquired at a given channel associated with the first controller, using the first controller. The calculated property and the direction of the given channel may be sent to a second controller having channels of the digitizer associated therewith, using the first controller. The signal may be scanned for at each channel having the direction of the given channel, at acquisition intervals based upon the calculated property, using the first controller and the second controller.

DETAILED DESCRIPTION

One or more embodiments of the present disclosure will be described below. These described embodiments are only examples of the presently disclosed techniques. Additionally, in an effort to provide a concise description, all features of an actual implementation may not be described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Figure 1:
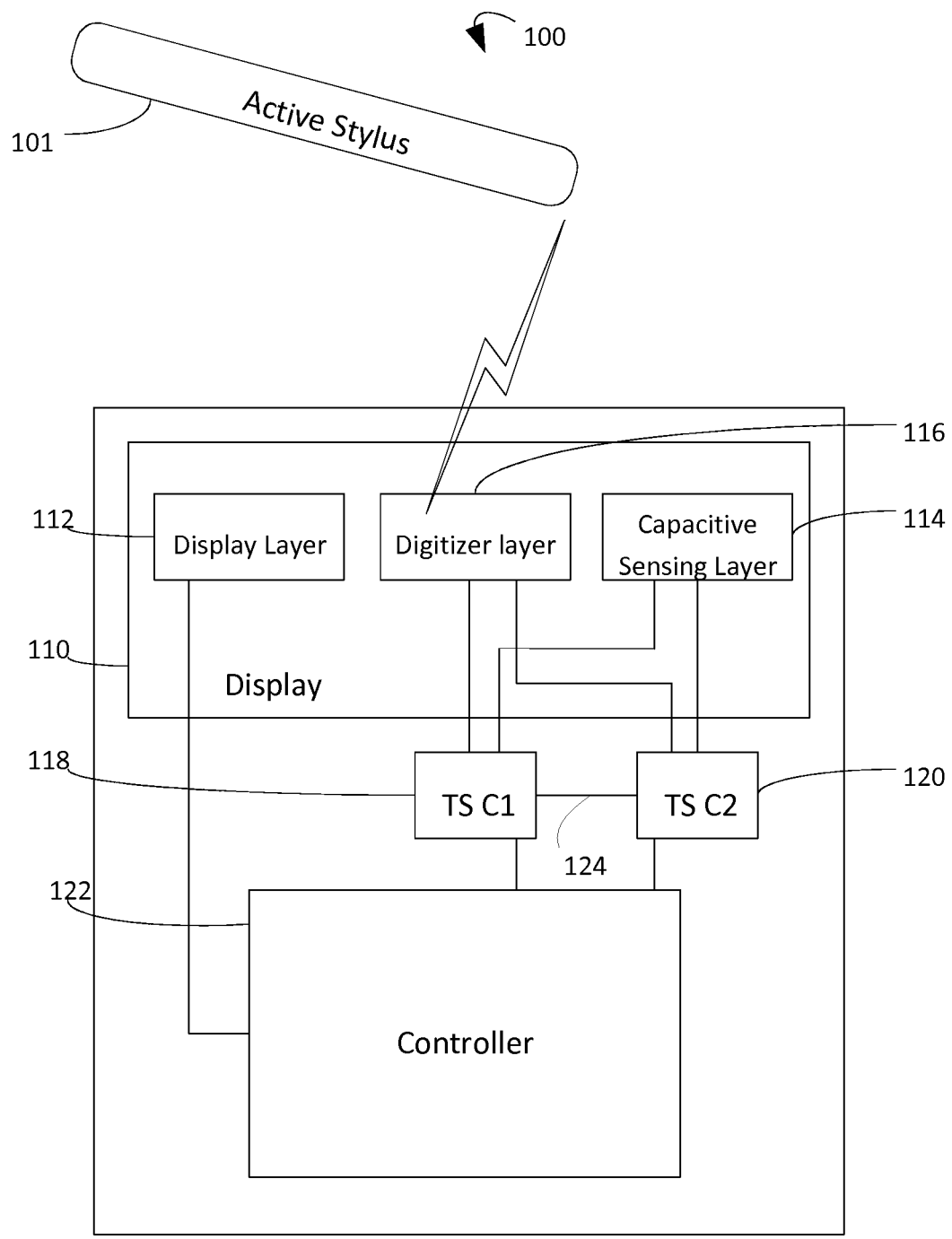
FIG. 1 is a schematic block diagram of an electronic device that includes a touch sensitive screen to receive input from an active stylus, in accordance with the present disclosure.

Referring initially to FIG. 1, an electronic device 100 is now described. The electronic device 100 may be a laptop, tablet, or smartphone, for example, and includes a touch sensitive display 110. The touch sensitive display 110 includes a display layer 112, a capacitive sensing layer 114, and a digitizer layer 116. The display layer 112 serves to display output, such as graphics and text, to a user. The capacitive sensing layer 114 serves to receive input from a finger, or a passive stylus, by sensing the change in capacitance between itself and the finger or passive stylus. The digitizer layer 116 serves to receive input from an active stylus 101, which transmits a signal from its tip. The x and y channels of this single device are multiplexed to operate in a stylus reception mode and in a touch sensing mode. Furthermore, in the touch sensing mode, the electronic device 100 can operate with either a mutual capacitance sensing between the x and y channels, or a self-capacitance sensing on both the x and y channels.

The digitizer layer 116 is coupled to first and second touch screen controllers 118, 120 (labeled as TSC1 and TSC2). For communication therebetween, the touch screen controllers 118, 120 are coupled to each other via a serial bus 124. The first and second touch screen controllers 118, 120 each operate based upon the same clock. The first and second touch screen controllers 118, 120 are coupled to a controller 122 so as to facilitate user input to the electronic device 100, and the display layer 112 is coupled to the controller so as to facilitate output to the user. To determine the location of a finger, or a passive stylus, on the touch sensitive display 110, the touch screen controllers 118, 120 operate the capacitive sensing layer 114 in a cascade mode, which is known to those of skill in the art and needs not be described herein.

Figure 2:
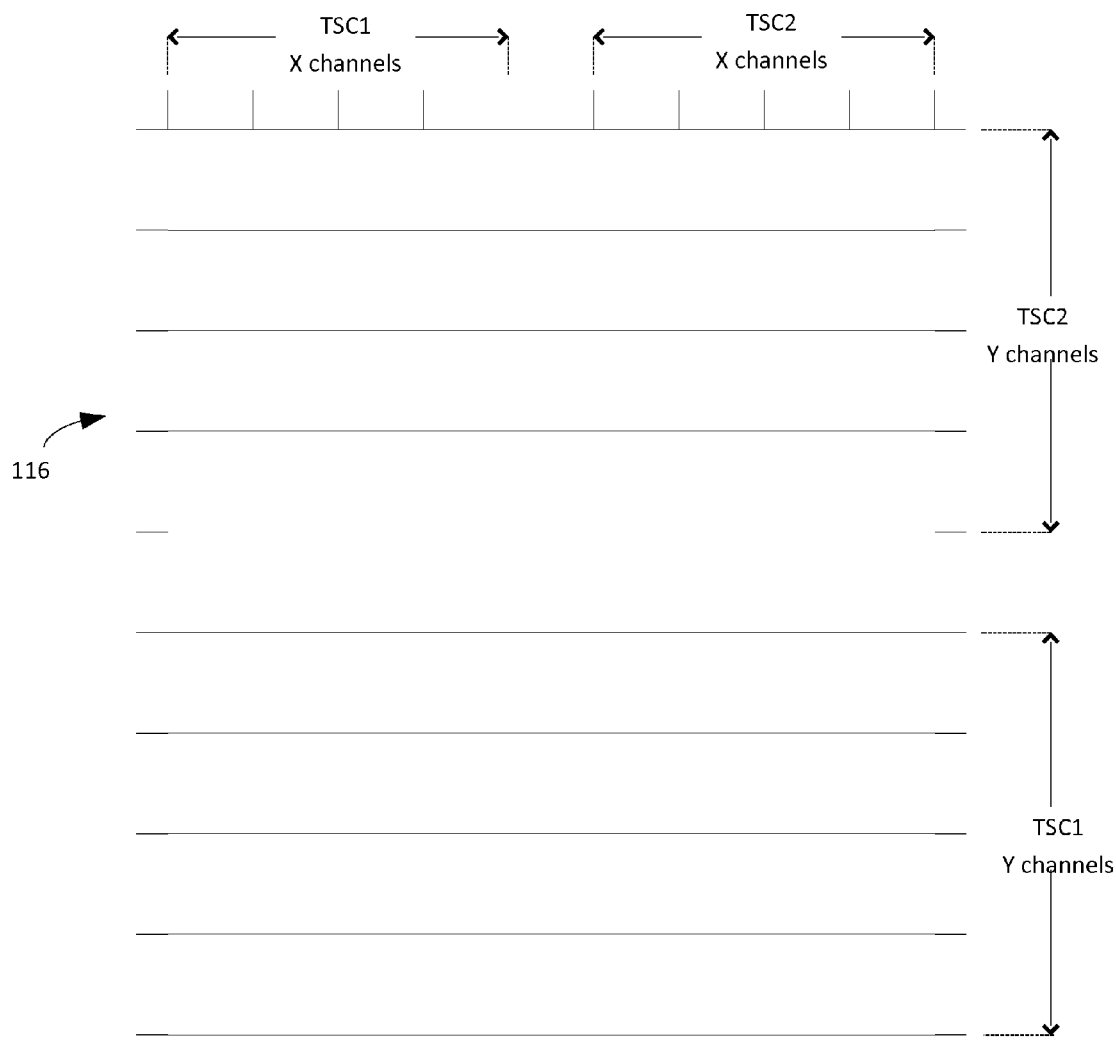
FIG. 2 is a schematic block diagram of the digitizer of FIG. 1 showing the channels thereof and the association of those channels with the touch screen controllers.

To determine the location of an active stylus on or from the touch sensitive display 110, the touch screen controllers 118, 120 operate according to an active stylus data acquisition mode, which will be described below. Before the active stylus data acquisition mode is described, however, additional details of the digitizer layer 116 and the touch screen controllers 118, 120 will first be described with reference to FIG. 2.

The digitizer layer 116 includes channels in a first direction, and channels in a second direction. These are illustratively shown as being channels in the X direction (i.e. X channels) and channels in the Y direction (i.e. Y channels), although it should be understood that the channels need not be in the X or Y direction, and that the first and second directions need not be perpendicular. Indeed, the first and second direction may be any directions that are not parallel to each other. Although the X and Y channels are shown as intersecting, it should be understood that the physical X channels are spaced apart from the physical Y channels, typically by 1-5 µm, and that they are not shorted together. Again, it should be noted that the x and y channels can be used for capacitive sensing as well as digitizing.

Some of the X channels are associated with the first touch screen controller 118, while the other X channels are associated with the second touch screen controller 120. Similarly, some of the Y channels are associated with the first touch screen controller 118, while the other Y channels are associated with the second touch screen controller 120. This setup is arranged so as to divide the capacitive sensing and digitizer layer into quadrants, with each touch screen controller 118, 120 having exclusive domain over one quadrant.

As shown, the first touch screen controller 118 has exclusive domain over the lower left quadrant, while the second touch screen controller 120 has exclusive domain over the upper right quadrant. The other two quadrants are shared by the first and second touch screen controller 118, 120. As shown, the first touch screen controller 118 has domain over the X channels of the upper left quadrant while the second touch screen controller 120 has domain over the Y channels of the upper left quadrant, and the second touch screen controller has domain over the X channels of the lower right quadrant while the first touch screen controller has domain over the Y channels of the lower right quadrant.

Figure 3:
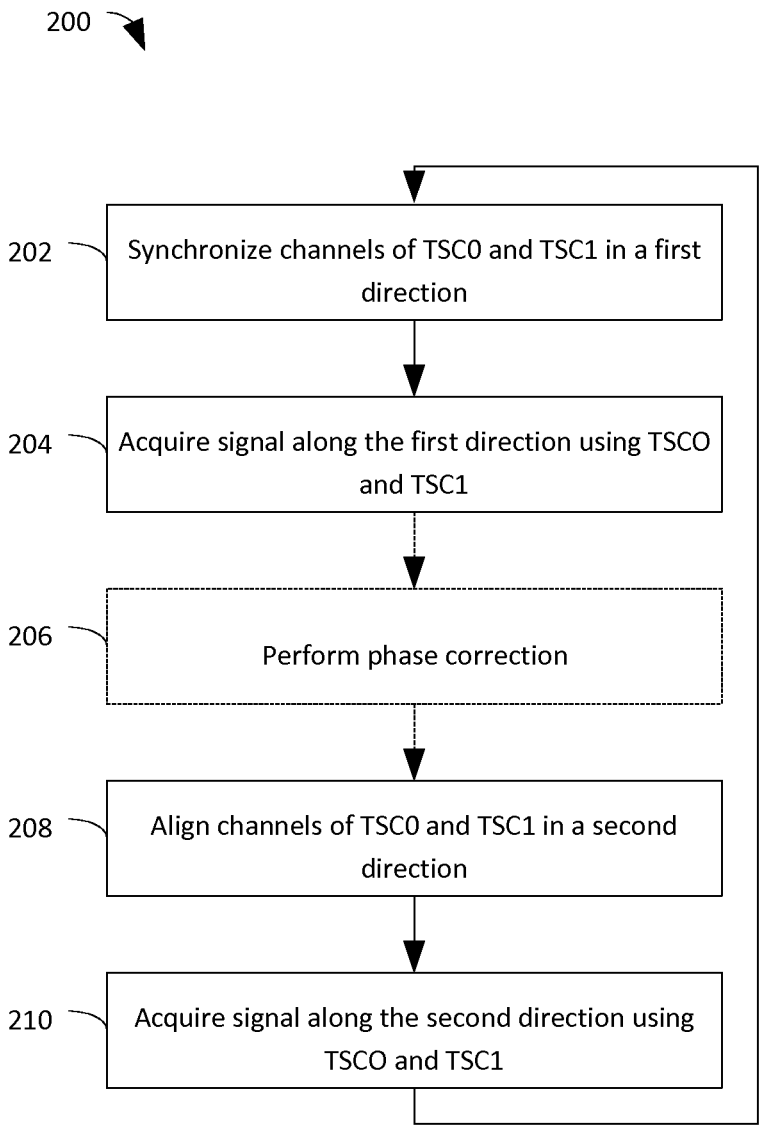
FIG. 3 is a flowchart illustrating the method of controlling the touch screen controller of FIG. 1 to acquire data from the active stylus.

Referring now to the flowchart 200 of FIG. 3, operation of the touch screen controllers according to the active stylus data acquisition mode is now generally described. Greater details will be given after this discussion.

First, since the channels of the touch screen controllers are not initially synchronized, the channels of the touch screen controllers are synchronized in a first direction (Block 202) such that they can detect and process the signal from the active stylus in the same way. Once the channels of the touch screen controllers are synchronized in the first direction, the touch screen controllers then attempt to receive the signal at their channels along that first direction so as to acquire data along that direction (Block 204).

An optional phase correction is then performed so that the signal acquired by the touch screen controllers is received properly, despite the presence of a phase shift of the signal, or a mismatch between the signal and an expected signal (Block 206).

Thereafter, the channels of the touch screen controllers are aligned in the second direction (208), and the controllers attempt to receive the signal at their channels along the second direction so as to acquire data along the second direction (Block 210). Since data has now been acquired in each direction, the controller may now use this data to determine information such as the pressure at which the stylus is pressed into the touch screen, accelerometer data from the stylus, etc. The strength of the signal acquired is then used to determine location of the active stylus.

Figure 4:
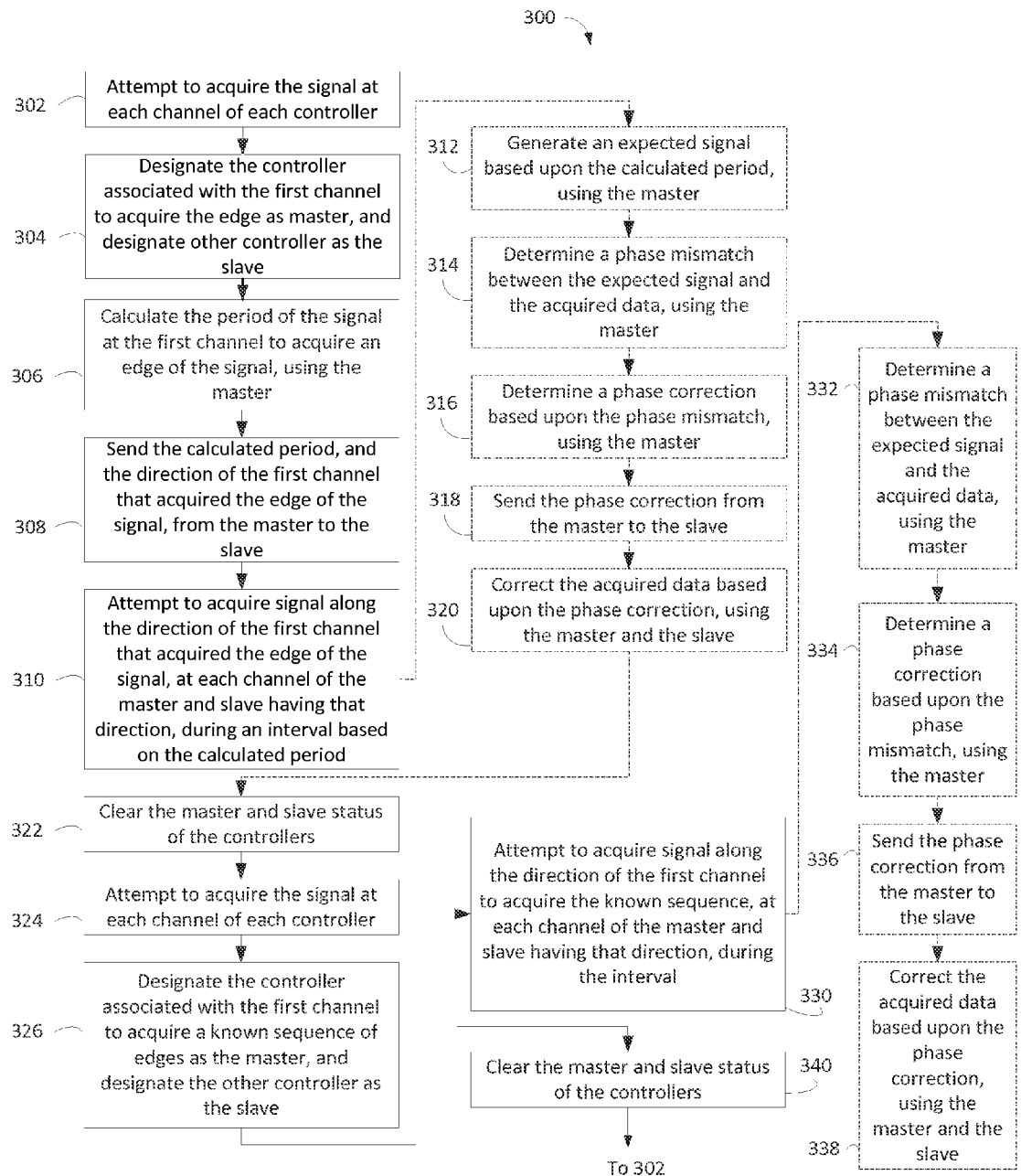
FIG. 4 is a flowchart illustrating a more detailed method of controlling the touch screen controller of FIG. 1 to acquire data from the active stylus.

More details of operation of the touch screen controllers in the active stylus data acquisition mode will now be given with reference to the flowchart 300 of FIG. 4. As explained above, the active stylus generates and transmits a signal from its tip. The touch screen controllers each scan for the signal at each of their channels (Block 302).

The nearest channel to the tip of the active stylus will have the strongest capacitive coupling to the tip, and thus will receive a higher amplitude signal in a shorter period of time than the other channels. This channel will therefore be the first channel to report detection of an edge. In the case where multiple channels receive the edge of the signal simultaneously, the channel considered to be the first to report the detection of the edge will be that where the edge has the greatest amplitude, or the channel closest to the middle of the group of channels that received the edge of the signal simultaneously. The touch screen controller associated with the first channel to report the detection of the edge will then be designated as a master touch screen controller, while the other will be designated as a slave touch screen controller (Block 304).

Thereafter, a period of the signal acquired at the first channel, which will be used to anticipate and acquire the edges of the signal, is calculated, using the master (Block 306). Although this embodiment has been described as calculating the period of the signal, it should be understood that other properties of the signal, such as the frequency or wavelength, may additionally or alternatively be calculated. The calculated period (and/or other property of the signal) is then sent from the master to the slave, along with the direction of the channel that first detected the edge of the signal (Block 308).

The received property and direction are used by the slave to synchronize itself with the master such that the master and slave are configured to acquire data along the same direction and in phase with each other. The master and slave then attempt to receive the signal at their channels along the direction of the channel that first detected the edge of the signal, and do so during an acquisition interval determined from the calculated period of the signal (Block 310), so as to acquire data in that direction.

Next, an optional phase correction may be performed. To perform the phase correction, the master is used to generate an expected signal based upon the calculated period (Block 312), and to then determine a phase mismatch between the expected signal and the data just acquired by the master and slave (Block 314). As an example of how the expected signal is generated, consider a sample case where the calculated period of the signal is equal to 100 clock cycles. Therefore, when 15 periods of the signal have been counted, 1500 clock cycles should have passed. If, however, 1510 clock cycles have passed when 15 periods of the cycle have been counted, there may be a mismatch between the frequency of the expected signal and the frequency of the received signal. To determine whether there is a frequency mismatch, the phase between the expected signal and the received signal is monitored over time. If the phase changes over time, then there is a frequency mismatch.

If such a phase mismatch (and thus frequency mismatch) is found, the master determines a phase correction based on the phase mismatch (Block 316), and sends the phase correction to the slave (Block 318). The phase correction is equal to the change in the phase between the expected signal and the acquired signal. The master and slave then correct the signal acquired, using this phase correction (Block 320). Therefore, the phase correction does not actually correct a frequency mismatch, but rather enables the touch screen controllers to work accurately despite a frequency mismatch. The phase correction described with respect to Blocks 312, 314, 316, 318, and 320 may be repeated for each data packet of the signal acquired from the active stylus.

The phase mismatch may indicate the presence of noise. If the phase mismatch changes irregularly, or changes by a large amount in a small period of time, noise is likely present. The noise may be filtered by averaging the amplitudes of multiple pulses received from the active stylus.

After the phase correction, the master and slave status are cleared from the touch screen controllers (Block 322). Next, an alignment is performed. During alignment, each channel of each touch screen controller that has a direction that is not parallel to the direction of the channels that were scanned for data at Block 310 attempts to acquire the signal (Block 324). The touch screen controller associated with the first channel to acquire a known sequence of edges is then designated as the master, while the other controller is designated as the slave (Block 326). The master and slave then scan for the signal from the active stylus along that direction at each of their channels having that direction, during the interval (Block 330). If the majority of the edges received are opposite in sign to the known sequence, operation proceeds as described, but the phase correction described below is not performed. This scenario indicates an error in the data reception along the first direction scanned. Although the data may be compromised and discarded, the position of the touch can be determined using the relative signal amplitudes from different channels.

Another optional phase correction may then be performed at Blocks 332, 334, 336, 338. This optional phase correction is performed like the phase correction from Blocks 312, 314, 316, 318, 320, and needs not be described in further detail herein. As with the previous phase correction, this phase correction may be performed for each pulse or packet of pulses of the signal received from the active stylus.

The master and slave status are then cleared from the touch screen controllers (Block 340), and the method repeats, going back to Block 302.

Although the devices and methods herein have been described with reference to two touch screen controllers, those of skill in the art will understand that the devices and methods herein are applicable to any number of touch screen controllers. In such a case, operation proceeds as described herein, with the change being that the touch screen controller designated as the master sends the requisite information for synchronization, alignment, and phase correction to the other touch screen controllers, all of which are designated as slave controllers.

While the disclosure has been described with respect to a limited number of embodiments, those skilled in the art, having benefit of this disclosure, will appreciate that other embodiments can be envisioned that do not depart from the scope of the disclosure as disclosed herein. Accordingly, the scope of the disclosure shall be limited only by the attached claims.

The invention claimed is:

1. An electronic device comprising:
   a first controller associated with some channels of a digitizer having channels configured to receive a signal from a stylus, each channel having a direction;
   a second controller associated with channels of the digitizer not associated with the first controller;
   the first controller configured to:
      scan for the signal at each channel associated with the first controller,
      based on acquisition of the signal at a given channel associated with the first controller, calculate a property of the signal,
      determine a phase mismatch between an expected signal and the signal acquired at the given channel and an associated phase correction, and
      filter noise from the signal acquired at each channel associated with the first controller, based upon the phase mismatch being greater than a threshold phase mismatch, and
      send the calculated property, the phase correction, and the direction of the given channel to the second controller; and
   the first controller and the second controller configured to:
      scan for the signal at each channel having the direction of the given channel, at acquisition intervals based upon the calculated property, and
      correct the signal acquired at each channel, using the phase correction.

2. The electronic device of claim 1, wherein the property of the signal comprises a period of the signal.

3. The electronic device of claim 1, wherein the first controller is configured to scan for the signal at each channel associated with the first controller having a direction not parallel to the direction of the given channel, at the acquisition intervals.

4. The electronic device of claim 3, wherein the second controller is configured to, based upon a failure of the first controller acquire the signal at a channel in the direction not parallel to the direction of the given channel, scan for the signal at each channel associated with the second controller, at the acquisition intervals.

5. The electronic device of claim 4, wherein the second controller is configured to, based on acquisition of the signal at a given channel associated with the second controller, scan for the signal at each channel having the direction not parallel to the direction of the given channel, at the acquisition intervals.

6. The electronic device of claim 1, wherein the first controller is configured to acquire the signal based upon the given channel receiving an edge of the signal before other channels of the first controller.

7. The electronic device of claim 1, wherein the first controller is configured to acquire the signal based upon a plurality of channels of the first controller receiving an edge of the signal during a same period of time and the given channel being located physically between channels of the plurality of channels.

8. An electronic device comprising:
a stylus configured to transmit a signal;
a digitizer having channels, each channel being associated with one of a first direction and a second direction;
a first controller associated with some channels of a digitizer in the first direction and some channels of the digitizer in the second direction;
a second controller associated with channels of the digitizer not associated with the first controller; and
wherein the first and second controller are configured to:
synchronize with each other in the first direction based upon a property of the signal as received at a channel associated with the first direction,
scan for the signal at each channel associated with the first direction,
synchronize with each other in the second direction, and
scan for the signal at each channel associated with the second direction;
wherein one of the first controller and the second controller is configured to determine a phase mismatch between an expected signal and the received signal and an associated correction, and to transmit the correction to the other of the first controller and second controller;
wherein one of the first controller and the second controller are configured to filter noise from the signal acquired at each channel, based upon the phase mismatch being greater than a threshold phase mismatch;
wherein the first controller and second controller are configured to correct the signal acquired at each channel, using the correction.

9. The electronic device of claim 8, wherein the first controller and second controller are configured to correct the signal acquired at each channel, using the correction.

10. A method of operating an electronic device comprising:
scanning for a signal from a stylus to each channel of a digitizer associated with a first controller, each channel having a corresponding direction;
calculating a property of the signal based on the signal as acquired at a given channel associated with the first controller, using the first controller;
sending the calculated property and the direction of the given channel to a second controller having channels of the digitizer associated therewith, using the first controller;
scanning for the signal at each channel having the direction of the given channel, at acquisition intervals based upon the calculated property, using the first controller and the second controller;
determining a phase mismatch between an expected signal and the signal acquired at the given channel and an associated phase correction, and sending the phase correction to the second controller, using the first controller;
correcting the signal acquired at each channel having the direction of the given channel, with the phase correction, using the first controller and the second controller; and
filtering noise from the signal acquired at each channel, based upon the phase mismatch being greater than a threshold phase mismatch, using the first controller.

11. The method of claim 10, wherein the property of the signal comprises a period of the signal.

12. The method of claim 10, further comprising scanning for the signal at each channel associated with the first controller and having a direction not parallel to the direction of the given channel, at the acquisition intervals, using the first controller.

13. The method of claim 12, further comprising scanning for the signal at each channel associated with the second controller, based upon a failure of the first controller to acquire the signal at channels having the direction not parallel to the direction of the given channel, using the second controller.

14. The method of claim 13, further comprising scanning for the signal at each channel associated with the second controller having the direction not parallel to the direction of the given channel, at the acquisition intervals, based acquisition of the signal at a given channel associated with the first controller, using the second controller.

* * * * *